United States Patent [19]

Lefevre et al.

[11] E Re. 29,355

[45] Reissued Aug. 16, 1977

[54] BOARD GAME APPARATUS

[76] Inventors: André Lefevre; Rosemary Loweth Lefevre, both of 4 rue Albert Malet, 75012 Paris, France

[21] Appl. No.: 670,708

[22] Filed: Mar. 26, 1976

Related U.S. Patent Documents

Reissue of:

[64] Patent No.: 3,799,552
Issued: Mar. 26, 1974
Appl. No.: 250,360
Filed: May 4, 1972

[30] Foreign Application Priority Data

May 5, 1971 France ..... 71.16188

[51] Int. Cl.[2] ..... A63F 3/00

[52] U.S. Cl. ..... 273/134 AF; 273/134 AD; 273/134 D; 273/134 AT

[58] Field of Search ..... 273/134

[56] References Cited

U.S. PATENT DOCUMENTS

| | | | |
|---|---|---|---|
| 3,163,423 | 12/1964 | Jackson | 273/134 AF |
| 3,163,424 | 12/1964 | Lindsey | 273/135 AC |
| 3,198,521 | 8/1965 | Kramer et al. | 273/134 AF |

*Primary Examiner*—Delbert B. Lowe
*Attorney, Agent, or Firm*—Weiser, Stapler & Spivak

[57] ABSTRACT

A parlor game designed to acquaint the players with the functioning of the securities market. The game comprises a board, having imprinted thereon a track, game pieces including tokens movable about the track, simulated currency, simulated stock certificates and dice. The track is bordered by a color-coded frame, which includes numerical indicia and which encompasses a numerical tabulation at the center of the board, and the dice are similarly coded whereby data in the tabulation is keyed to the numerical indicia appearing on the dice. The game board has imprinted thereon numerical data in tabular form surrounding said track; the track having segments which carry indicia corresponding to the companies represented by the simulated stock certificates.

12 Claims, 1 Drawing Figure

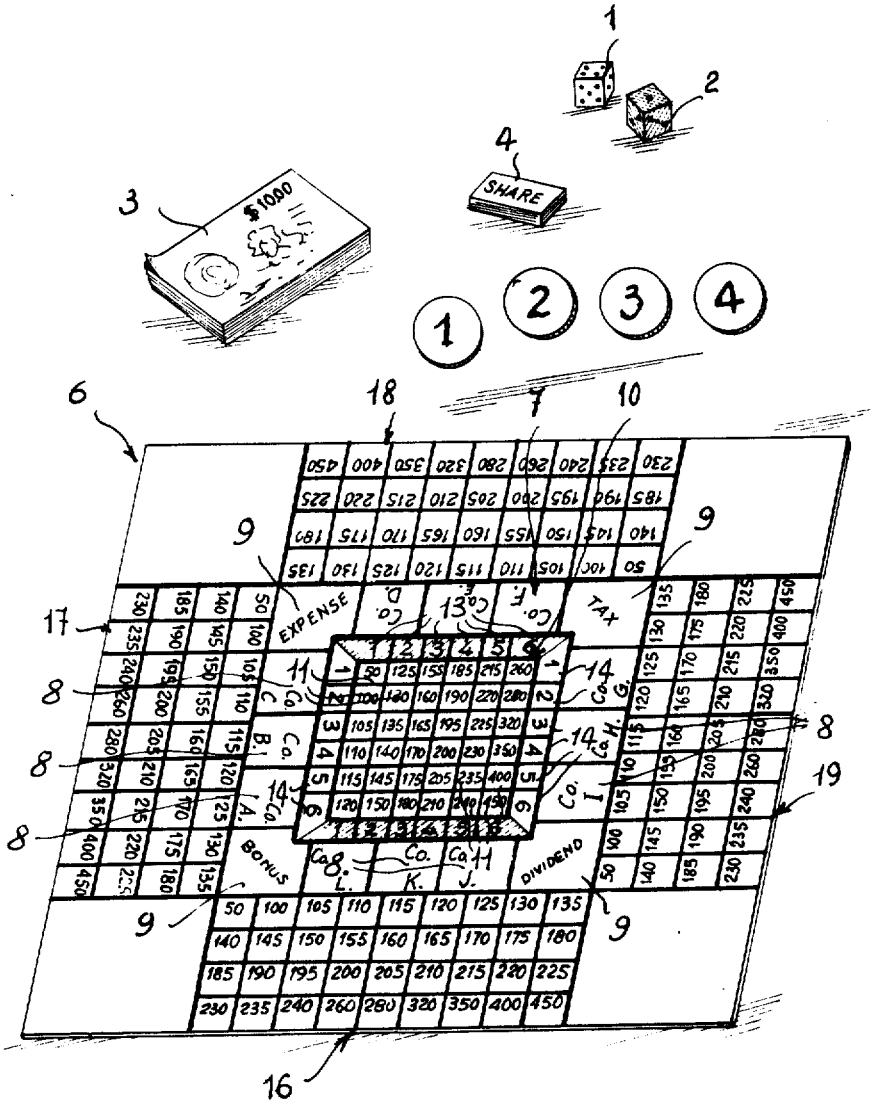
1
2
3
4
SHARE
$1000
1
2
3
4
6
18
7
10
9
9
17
8
8
8
8
19
9
9
16
EXPENSE
TAX
BONUS
DIVIDEND
Co. A.
Co. B.
Co. C.
Co. D.
Co. E.
Co. F.
Co. G.
Co. H.
Co. I.
Co. J.
Co. K.
Co. L.
11
13
14
14
14
50 100 105 110 115 120 125 130 135
140 145 150 155 160 165 170 175 180
185 190 195 200 205 210 215 220 225
230 235 240 260 280 320 350 400 450

BOARD GAME APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to the field of education and particularly to familiarization with the functioning of the securities market. More specifically, this invention is directed to a parlor game for acquainting the players with the workings of a stock exchange.

2. Description of the Prior Art

Games which simulated the workings of the securities market had previously been proposed. Such prior art games, however, have typically been characterized by rather complex rules and have been difficult to play. Additionally, prior art games having as their purpose the acquainting of the players with the workings of a stock exchange have been characterized by a substantial number of parts which not only render the game difficult to play but also result in the possibility of the game being rendered useless through the loss of a part.

SUMMARY OF THE INVENTION

The present invention overcomes the above briefly discussed and other deficiencies and disadvantages of the prior art by providing a novel and improved game particularly well suited for initiating players to the workings of a stock exchange. In accordance with the invention the novel game comprises a game board characterized by a generally rectangular frame divided into a number of discrete indicia bearing sections. Information in tabular form is provided at the periphery of the game board at the four sides thereof. The game board also includes a region at the middle of the board where additional information keyed to the numerals on two diversely colored dice is presented in tabular form. This region at the middle of the board cooperates with the tabular indicia at the sides of the board to define a rectangular track therebetween. The game also includes tokens or pawns for each player, the game typically being arranged for use by up to four individuals, simulated money, game cards and the aforementioned diversely colored dice.

BRIEF DESCRIPTION OF THE DRAWING

The present invention may be better understood and its numerous objects and advantages will become apparent to those skilled in the art by reference to the accompanying drawing which depicts a preferred embodiment of the invention.

DESCRIPTION OF THE PREFERRED EMBODIMENT

With reference now to the drawing, the game of the present invention employs the two dice 1 and 2; the die 1 typically being colored white while the die 2 is typically colored red or some other diverse color. The game also includes simulated currency, indicated at 3, of four or more denominations. Since the game of the present invention is intended for initiating the players to the workings of the stock exchange the game also includes cards 4 which represent shares of stock. Finally, the game includes the tokens or game pieces, shown as numbered discs, and the game board 6.

Board 6 defines a track 7 which is divided into twelve discrete areas 8. The name of a fictitious company will by printed in each of areas 8 while the four corner areas 9 of track 7 are inscribed, respectively, BONUS, DIVIDEND, TAX and EXPENSE. The track 7 in turn defines, at the center of the board, a square area having a frame about its periphery. Each side of the frame is divided, as indicated by reference numerals 13 and 14, into six regions bearing numerical indicia corresponding to the numerical indicia on the dice. Oppositely disposed sides of the frame are colored alike and adjoining sides of the frame are matched to the colors of dice 1 and 2. At the center of the game board, enclosed by the frame 13–14, is an area 11 which has been divided into 36 subdivisions. Each of the 36 subdivisions in area 11 has a number imprinted therein; the numbers typically ranging from 50 to 450.

The game board 6 also contains, to the outside of track 7, tables 16, 17, 18 and 19. Each of these four tables is divided into 36 areas and constitutes a repetition of the table 11 at the center of the game board.

The use of the invention will now be described. Before starting the game each player is handed one of the tokens or playing pieces as represented by the numeral bearing discs. As will become apparent from the description below, the player must move his token on the track 7. Each player also receives an amount of the simulated money. One of the players may be designated as "banker" and another as "exchange agent". To start the play, each player places his token in the corner 9 of the track 7 situated to his left and in turn throws the dice. The sum of the numbers on the dice indicates the number of spaces along track 7 which the token may be advanced. Should the token land in one of the twelve areas 8 of track 7 having thereon a company name the player will be entitled to buy shares of this company for an amount per share corresponding to the number in the table at the center of the board corresponding to the intersection of the columns commensurate with the numbers on the diversely colored dice. Thus, considering the example situation presented in the drawing where the white die indicates the number 4 and the red die indicates the number 1, the player may purchase shares for 110 units of currency. Alternatively, the player may sell shares previously purchased to the exchange agent for this price. Shares purchased by the player must be placed on the board in the table immediately in front of him, for example table 16, on the square corresponding to the price paid so that he will not forget, as the game advances, the purchase price of his stock.

The game proceeds with each player buying or selling shares that have been acquired by chance corresponding to the companies inscribed in the portions 8 of track 7. The corner areas 9 correspond to the EXPENSE, TAX or DIVIDEND that can be brought about by the possession of shares and the area BONUS may allow a player landing in this square an advantage according to special rules which may be adopted to enhance the interest of the game. Additional rules may be provided to enable the banker to lend money to a player unable to pay his taxes or expenses or to enable a player to buy shares at a rate lower than the normal rate. If there are no shares of a company available for purchase from the exchange agent when a player reaches the corresponding area 8, the rules may require the player to either proceed on his next turn or wait until one of the other players has sold shares to the exchange agent.

The game may be terminated on a time basis or in accordance with wealth accumulated.

While a preferred embodiment has been shown and described, various modifications and substitutions may be made without departing from the spirit and scope of the invention. Accordingly, it is to be understood that the present invention has been described by way of illustration and not limitation.

What is claimed is:

1. A parlor game comprising:

tokens;

simulated currency;

a pair of conventional dice;

a game board, said board including a rectangular central portion sub-divided into discrete areas containing numerical indicia arranged in columns and rows, said central portion being bounded by a frame, the frame containing on each side numerical indicia corresponding to the numerical indicia on each die, the frame numerical indicia being aligned with respective rows and columns of the numerical indicia in the central portion, the game board further comprising a track for the movement of said tokens about the frame, the track being divided into segments and at least some of said track segments having indicia imprinted thereon, said track segment indicia designating objects available for purchase with said simulated currency, there being a plurality of different objects, said objects being cards bearing indicia corresponding to the indicia imprinted on the track.

2. The game of claim 1 wherein the central portion of the game board is subdivided into 36 areas.

3. The game of claim 1 wherein said game board further comprises:

information in tabular form disposed between the edge of the game board and the track, there being four tabular presentations each repeating the indicia in the central portion.

4. The game of claim 2 wherein said game board further comprises:

information in tabular form disposed between the edge of the game board and the track, there being four tabular presentations each repeating the indicia in the central portion.

5. The game of claim 2 wherein the dice are diversely colored and adjacent sides of said frame are colored the same as the diversely colored dice.

6. The game of claim 4 wherein the dice are diversely colored and adjacent sides of said frame are colored the same as the diversely colored dice.

7. The game of claim 3 wherein the dice are diversely colored and adjacent sides of said frame are colored the same as the diversely colored dice.

8. The game of claim 1 wherein the dice are diversely colored and adjacent sides of said frame are colored the same as the diversely colored dice.

*9. A parlor game adapted to be played with tokens representing the different players, and with simulated currency, said game comprising:*

*a game board including*

*a first portion subdivided into discrete areas containing numerical indicia arranged in rows and columns,*

*a second portion subdivided into two sets of areas, the areas of one set being aligned with respective ones of the rows, and the areas of the other set with respective ones of the columns of the first portion, the areas of each set having distinctively different indicia denoting the different rows or columns with which they are aligned,*

*a third portion defining a track for movement of the tokens and divided into segments, at least some of the segments having indicia thereon designating objects available for purchase with the simulated currency, there being a plurality of different objects, the objects being cards bearing indicia corresponding to the indicia on the track; and*

*means operable by the players to select on the basis of chance specific ones of the indicia in the two sets of areas in the second portions, and to determine the movement of the tokens along the track.*

*10. The game of claim 9, wherein the board further comprises a plurality of additional portions, each containing the same numerical indicia arranged in rows and columns as the first portion.*

*11. The game of claim 9, wherein the track includes segments not designating objects available for purchase with the simulated currency.*

*12. The game of claim 11, wherein the last-named segments contain directions to the players referring them to information not contained on the board.*

* * * * *